(12) United States Patent
Siriwardane et al.

(10) Patent No.: US 9,138,683 B1
(45) Date of Patent: Sep. 22, 2015

(54) $CO_2$ REMOVAL SORBENT COMPOSITION WITH HIGH CHEMICAL STABILITY DURING MULTIPLE CYCLES

(71) Applicants: Ranjani V. Siriwardane, Morgantown, WV (US); Shira Rosencwaig, Newton, MA (US)

(72) Inventors: Ranjani V. Siriwardane, Morgantown, WV (US); Shira Rosencwaig, Newton, MA (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 14/297,848

(22) Filed: Jun. 6, 2014

Related U.S. Application Data

(63) Continuation of application No. 13/867,192, filed on Apr. 22, 2013.

(51) Int. Cl.
| | |
|---|---|
| *B01J 20/30* | (2006.01) |
| *B01J 20/04* | (2006.01) |
| *B01J 20/06* | (2006.01) |
| *B01D 53/04* | (2006.01) |
| *B01D 53/52* | (2006.01) |
| *B01D 53/62* | (2006.01) |

(52) U.S. Cl.
CPC ..................................... *B01D 53/62* (2013.01)

(58) Field of Classification Search
CPC ............ B01J 20/30; B01J 20/04; B01J 20/06; B01J 20/2805; B01J 20/3042; B01J 20/3078; B01D 53/02; B01D 53/52; B01D 53/62
See application file for complete search history.

(56) References Cited

U.S. PATENT DOCUMENTS

| | | | | | |
|---|---|---|---|---|---|
| 3,065,054 | A | * | 11/1962 | Haden, Jr. et al. | 423/701 |
| 3,684,712 | A | * | 8/1972 | Bovard | 502/411 |
| 4,039,620 | A | * | 8/1977 | Netteland et al. | 423/230 |
| 4,433,981 | A | * | 2/1984 | Slaugh et al. | 95/139 |
| 4,810,266 | A | * | 3/1989 | Zinnen et al. | 95/139 |
| 4,964,889 | A | * | 10/1990 | Chao | 95/96 |
| 5,087,597 | A | * | 2/1992 | Leal et al. | 502/62 |
| 5,214,019 | A | * | 5/1993 | Nalette et al. | 502/400 |
| 5,231,063 | A | * | 7/1993 | Fukumoto et al. | 502/62 |
| 5,376,614 | A | * | 12/1994 | Birbara et al. | 502/402 |
| 5,480,625 | A | * | 1/1996 | Nalette et al. | 423/230 |
| 5,492,683 | A | * | 2/1996 | Birbara et al. | 423/230 |
| 5,876,488 | A | * | 3/1999 | Birbara et al. | 96/111 |
| 5,917,136 | A | * | 6/1999 | Gaffney et al. | 95/98 |
| 6,280,503 | B1 | * | 8/2001 | Mayorga et al. | 95/96 |
| 6,322,612 | B1 | * | 11/2001 | Sircar et al. | 95/97 |
| 6,908,497 | B1 | | 6/2005 | Siriwardane | |
| 7,045,483 | B2 | * | 5/2006 | Noda et al. | 502/243 |
| 7,314,847 | B1 | | 1/2008 | Siriwardane | |

* cited by examiner

*Primary Examiner* — Joseph D Anthony
(74) *Attorney, Agent, or Firm* — Jacob A. Heafner; Brian J. Lally; John T. Lucas

(57) ABSTRACT

Disclosed herein is a clay-alkali-amine $CO_2$ sorbent composition prepared by integrating a clay substrate, basic alkali salt, and amine liquid. The basic alkali salt is present relative to the clay substrate in a weight ratio of from about 1 part to about 50 parts per 100 parts of the clay substrate. The amine liquid is present relative to a clay-alkali combination in a weight ratio of from about 1 part to about 10 parts per 10 parts of the clay-alkali combination. The clay-alkali-amine C02 sorbent is particularly advantageous for low temperature $CO_2$ removal cycles in a gas stream having a C02 concentration less than around 2000 ppm and an oxygen concentration around 21%, such as air.

19 Claims, 9 Drawing Sheets

CO₂ REMOVAL SORBENT COMPOSITION WITH HIGH CHEMICAL STABILITY DURING MULTIPLE CYCLES

RELATED APPLICATIONS

The present application is a continuation in part of U.S. patent application Ser. No. 13/867,192, filed a on Apr. 22, 2013 now allowed by the same inventors, the entirety of which is hereby incorporated by reference.

GOVERNMENT INTERESTS

The United States Government has rights in this invention pursuant to the employer-employee relationship of the Government to the inventors as U.S. Department of Energy employees and site-support contractors at the National Energy Technology Laboratory, and pursuant to Contract Research and Development Agreement (CRADA) No. AGMT-0255.

FIELD OF INVENTION

One or more embodiments of the present invention relates to a solid sorbent composition for the sorption of $CO_2$ from a gaseous stream, where the solid sorbent is comprised of a clay substrate, a basic alkali salt, and an amine liquid.

BACKGROUND $CO_2$ absorption processes using aqueous amine solutions facilitate the removal of $CO_2$ from gas streams in many industries. A common process is known as wet chemical stripping, where one or more reversible chemical reactions between $CO_2$ and amine substances produce liquid species such as carbamate. The conversion of carbamate back to $CO_2$ proceeds through a thermal regeneration process, typically at a temperature of about 120° C. As a result, the process is energy intensive. Additionally, the amine solution has a limited lifetime due to amine oxidation, and amine solutions may exacerbate carrion problems of associated process equipment.

To mitigate these issues, solid sorbents serve as alternatives to wet chemical stripping via the formation of carbamate species. Important considerations include the ability to regenerate an absorbent and the ease of its regeneration, and multiple solid $CO_2$ sorbents exist. Efforts have been made to reversibly adsorb $CO_2$ on silica gel modified with amine. See U.S. Pat. No. 5,087,597 to Leal et al., issued Feb. 11, 1992. Methods have also been disclosed for incorporating liquid amines onto the surface of support substrates having relatively high surface areas. See U.S. Pat. Nos. 5,876,488 and 5,492,683 to Birbara et al., issued Mar. 2, 1999 and Feb. 20, 1996 respectively, and see U.S. Pat. No. 4,810,266 to Zinnen et al., issued Mar. 7, 1989. Amines have also been distributed within the interlayers of clay substrates. See U.S. Pat. No. 6,908,497 to Siriwardane, issued Jun. 21, 2005.

The effective lifetime of these solid sorbents is impacted by amine oxidation in environments where the oxygen concentration is substantial. The interaction of amine with oxygen is known to degrade the amines. See e.g. Lepaumier et al., "new Amines for CO2 Capture. II Oxidative Degradation Mechanisms," Industrial & engineering Chemistry Research 48 (20) (2009), among others.

Since air contains 21% oxygen, air degradation is a significant concern. Correspondingly, it would be advantageous to provide a solid sorbent composition offering increased resistance to oxygen degradation over those currently offered.

Additionally, since the degradation mechanism with oxygen is reported to have acidic intermediates, it would be advantageous to provide a method by which the acidic intermediate formation could be minimized through inclusion of a relatively inexpensive material, such as an alkali.

Disclosed here is a composition of a clay-alkali-amine $CO_2$ sorbent exhibiting an increased effective lifetime in environments having substantial oxygen concentrations. The clay-alkali-amine $CO_2$ sorbent is an integration of a clay substrate, a basic alkali salt, and an amine liquid. The clay substrate serves as a plurality of internally situated reaction sites while the basic alkali salt acts as a strong base to generate a high pH environment. The basic alkali salt greatly mitigates oxygen degradation of the amine and significantly prolongs the useful life of the clay-alkali-amine $CO_2$ sorbent. The clay-alkali-amine $CO_2$ sorbent is particularly effective for low temperature $CO_2$ removal cycles from air/$CO_2$ having a $CO_2$ concentration less than around 1% and an oxygen concentration around 21%.

These and other objects, aspects, and advantages of the present disclosure will become better understood with reference to the accompanying description and claims.

SUMMARY

The sorbent disclosed provides a clay-alkali-amine $CO_2$ sorbent generated through the integration of a clay substrate, a basic alkali salt, and an amine liquid. The clay substrate generally serves as a plurality of internally situated reaction sites while the basic alkali salt acts as a strong base in order to generate a high pH environment. The effect of the basic alkali salt greatly mitigates oxygen degradation of the amine and significantly prolongs the useful life of the clay-alkali-amine $CO_2$ sorbent.

In a particular embodiment, the clay substrate is supplied as a plurality of clay substrate granules and the basic alkali salt is supplied as a plurality of basic alkali salt granules, and the clay-alkali-amine $CO_2$ sorbent is produced by initially generating a solid-solid, heterogeneous mixture of the clay substrate and the basic alkali salt. A limited quantity of liquid, such as water may be added to the solid-solid heterogeneous mixture in order to form porous clay-alkali pellets. The solid-solid heterogeneous mixture is then combined with the amine liquid to produce the clay-alkali-amine $CO_2$ sorbent.

The clay-alkali-amine $CO_2$ sorbent is prepared by mixing the clay substrate, the basic alkali salt, and the amine liquid. The basic alkali salt is present relative to the clay substrate in a weight ratio of from about 1 part to about 50 parts per 100 parts of the clay substrate. The amine liquid is present relative to the clay-alkali combination in a weight ratio of from about 1 part to about 10 parts per 10 parts of the clay-alkali combination.

The clay substrate is an aluminum phyllosilicate having a layered structure expanded by polar molecules. The cation of the basic alkali salt is comprised of Na, K, Li, Rb, Cs, Ca, Ba, or Sr and the anion could be a hydroxide, carbonate, acetate, phosphate, or oxide. The liquid amine is comprised of a primary amine, a secondary amine, a tertiary amine, an aromatic amine, a cyclic amine or combinations thereof. In one embodiment, the clay substrate is bentonite, the basic alkali salt is NaOH or $Na_2CO_3$, and the amine liquid is a diethanolamine (DEA) solution.

In another embodiment, the clay substrate is supplied as a plurality of porous clay pellets and the basic alkali salt is supplied as an alkali solution. In this embodiment, an amine-alkali liquid is generated by blending the liquid amine, the alkali solution, and a solvent, and the porous clay pellets are contacted with the amine-alkali liquid, allowing the amine-alkali liquid to penetrate the porous clay pellets. The clay-alkali-amine $CO_2$ sorbent thus produced may be additionally subjected to a drying step.

Results are presented illustrating the performance of the clay-alkali-amine $CO_2$ sorbent generated by the disclosed methods as compared to a clay-amine sorbent lacking the alkali inclusion.

The clay-alkali-amine $CO_2$ sorbent is particularly advantageous for low temperature $CO_2$ removal cycles where $CO_2$ is present at ppm levels and where oxygen concentrations are increased. For example, the clay-alkali-amine sorbent is particularly useful for low temperature $CO_2$ removal cycles when the gas stream is air/$CO_2$, having a $CO_2$ concentration less than around 2000 ppm and an oxygen concentration generally around 21%.

The novel process and principles of operation are further discussed in the following description.

DETAILED DESCRIPTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a clay-alkali-amine $CO_2$ sorbent composition produced by the integration of a clay substrate, a basic alkali salt, and an amine liquid.

The composition disclosed provides a clay-alkali-amine $CO_2$ sorbent comprised of a clay substrate, a basic alkali salt, and an amine liquid. The clay-alkali-amine $CO_2$ sorbent may be utilized for the capture of $CO_2$ from a gas stream. The clay substrate generally serves as a plurality of internally situated reaction sites to facilitate reaction of the amines in the amine liquid with the $CO_2$, and the basic alkali salt acts as a strong base which possibly absorbs $H_2O$ from the gas stream and generates a high pH environment. The effect of the basic alkali salt tends to greatly mitigate oxygen degradation of the amine and significantly prolong the useful life of the clay-alkali-amine $CO_2$ sorbent. The clay-alkali-amine $CO_2$ sorbent is particularly advantageous for low temperature $CO_2$ removal cycles where $CO_2$ is present at ppm levels and where oxygen concentrations are increased. For example, the clay-alkali-amine sorbent produces is particularly useful for low temperature $CO_2$ removal cycles when the gas stream is air, having a $CO_2$ concentration less than around 2000 ppm and an oxygen concentration generally around 21%.

The clay-alkali-amine $CO_2$ sorbent is prepared by mixing the clay substrate, the basic alkali salt, and the amine liquid. The basic alkali salt is present relative to the clay substrate in a weight ratio of from about 1 part to about 50 parts per 100 parts of the clay substrate. The amine liquid is present relative to the clay-alkali combination in a weight ratio of from about 1 part to about 10 parts per 10 parts of the clay-alkali combination.

Figure 1:
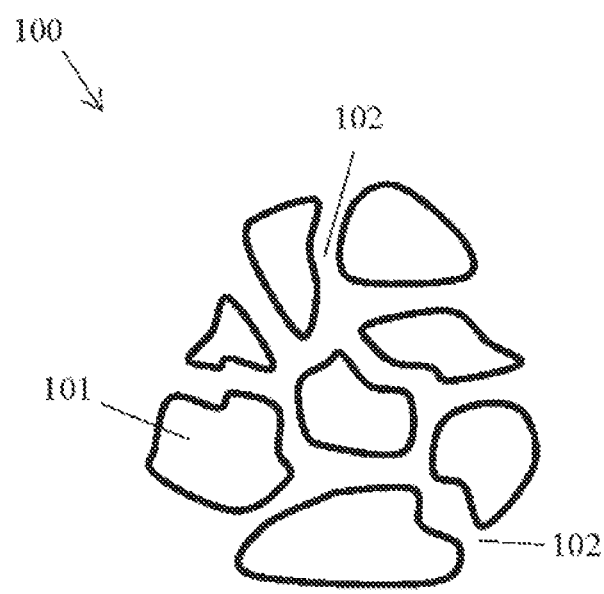
FIG. 1 illustrates the clay-alkali-amine $CO_2$ sorbent in the form of a pellet.

The clay-alkali-amine $CO_2$ sorbent in the form of a pellet is illustrated at FIG. 1. At FIG. 1, clay-alkali-amine $CO_2$ sorbent pellet 100 is comprised of substrate 101 comprised of the clay substrate, basic alkali salt, and the amine liquid throughout the structure of clay-alkali-amine $CO_2$ sorbent pellet 100. Clay-alkali-amine $CO_2$ sorbent pellet 100 contains pores 102 which are physically interconnected to create conduits within clay-alkali-amine $CO_2$ sorbent pellet 100. Thus fluids within an atmosphere surrounding clay-alkali-amine $CO_2$ sorbent pellet 100 and which contain the $CO_2$ to be absorbed can diffuse into the pores 102 to interact with and be reversibly bound to the amine comprising the amine liquid.

A substantial portion of the amines and basic alkali salt within the clay-alkali-amine $CO_2$ sorbent is encapsulated between expanded interlayers of the clay substrate. As is understood, polar liquids can enter between interlayers of certain substrates causing the lattice structure of the substrate to expand. One suitable substrate is bentonite, an inert mineral alumino-silicate whose main constituent is montmorillinite comprised of continuous layers of alumino-silicate sheets. The c-axis's dimension of the montmorillinite in bentonite may expand from 9.6 angstrom to an almost complete separation in the presence of polar liquids. See e.g., U.S. Pat. No. 6,908,497 to Siriwardane, issued Jun. 21, 2005, among others.

Figure 2:
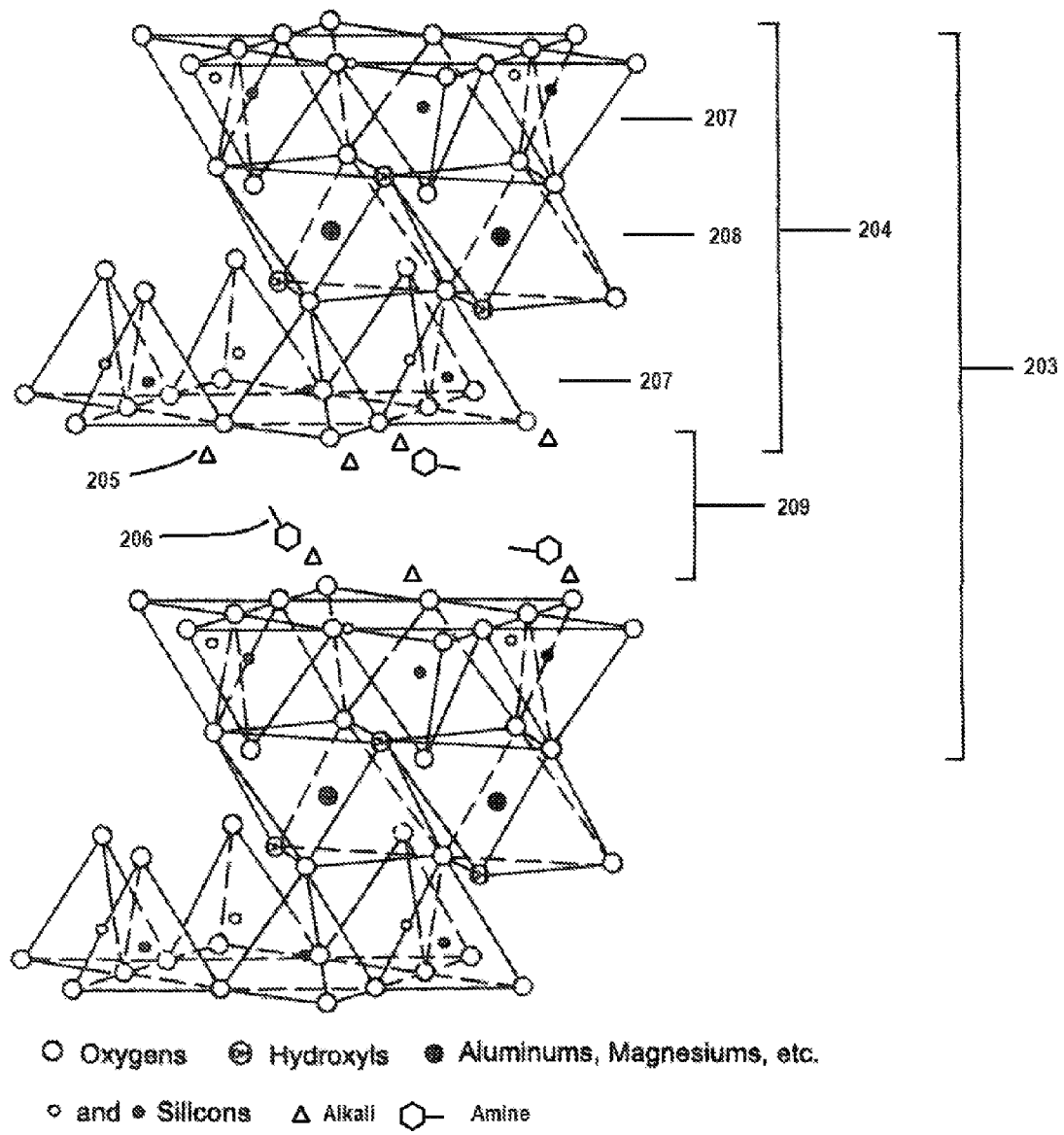
FIG. 2 illustrates interlayers of the clay-alkali-amine $CO_2$ sorbent.

The interlayers of the clay-alkali-amine $CO_2$ sorbent is illustrated at FIG. 2. At FIG. 2, a clay-alkali-amine $CO_2$ sorbent 203 is comprised of a clay substrate 204, a basic alkali salt 205, and an amine 206. The clay substrate 204 is illustrated as a montmormilionite with a 2:1 ratio of two tetrahedral silica sheets 207 and an octahedral sheet 208. Successive sheets of clay 204 form an interlayer region 209. As the clay interlayers expand, alkali salt 205 and amine 206 materials enter the interlayer region 209.

At high pH conditions (when alkali salt 205 is present), hydroxyls attached to Si and Al participate in the following reactions.

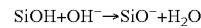

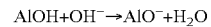

The polar nature of the amine 206 facilitates the bonding of the amine 206 to the ions associated with the clay substrate 204 and alkali salt 205 present in the interlayer region 209. Additionally, the amines 206 may have some bonding with alkali salt 205 which may dissolve in an amine/water solution present in the interlayer region 209.

The process for producing the clay-alkali-amine $CO_2$ sorbent is generally comprised of supplying a clay substrate, a basic alkali salt, and an amine liquid. The basic alkali salt is supplied relative to the clay substrate in a weight ratio of from about 1 part to about 50 parts per 100 parts of the clay substrate. In an embodiment, the clay substrate is supplied at 0.5 parts to about 5 parts per 15 parts of the clay substrate. The amine liquid is supplied relative to a clay-alkali-amine combination in a weight ratio of from about 1 part to about 10 parts per 10 parts of the clay-alkali combination. In an embodiment, the amine liquid is supplied at 0.5 parts to about 2 parts per 3 parts. Here the "clay-alkali combination" means a combined quantity of the clay substrate and the basic alkali salt supplied. The clay substrate, basic alkali salt, and amine liquid in the supplied quantities are integrated to produce the clay-alkali-amine $CO_2$ sorbent.

Within this disclosure, the basic alkali salt is comprised of a metallic cation and an anion, where the metallic cation is Na, K, Li, Rb, Cs, Ca, Ba, or Sr and where the anion is hydroxide ion, a carbonate ion, an acetate ion, a phosphate ion, or an oxide ion. Similarly, the second basic alkali salt when utilized may be comprised of a Na, K, Li, Rb, Cs, Ca, Ba, or Sr metallic cations and a hydroxide, carbonate, phosphate, acetate or oxide anions. In a particular embodiment the metallic cation is Na and the anion is a hydroxide or carbonate.

The basic alkali salt is a salt which can be formed by an anion derived from a weak acid and a cation derived from a strong base. As is understood, a weak acid is an acid which fails to ionize fully when dissolved in water. In an embodiment, the anion of the basic alkali salt is derived from a weak acid, where the weak acid has a pKa greater than or equal to −2. See e.g., W. M. Haynes, CRC Handbook of Chemistry and Physics (92nd Ed. 2012), among others. Additionally, in an embodiment, the basic alkali salt is comprised of at least 90% by weight of a basic alkali compound consisting of an alkali cation and an alkali anion, where the alkali cation is from the group consisting of Na, K, Li, Rb, Cs, Ca, Ba, Sr, and mixtures thereof, and the alkali anion is from the group consisting of a hydroxide ion, a carbonate ion, an acetate ion, a phosphate ion, an oxide ion, or mixtures thereof.

The clay substrate is an aluminum phyllosilicate comprised of a layered structure which can expand to allow polar molecules to reside therein. In a particular embodiment, the clay substrate is comprised of bentonite, however clays other than bentonite can be used, including but not limited to ball clay, fuller's earth, kaolin, attapulgite, hectorite, meerschaum, palygorskite, saponite, sepiaolite, common clay, and fire clay. Some clays may swell more than others, thus having greater absorption capacities. Some clays may be able to contain or otherwise accommodate a greater volume of polar liquids than others. Typically the aluminum phyllosilicate is a hydrous aluminum phyllosilicate.

The liquid amine is liquid comprised of an amine, where the amine is a primary amine, a secondary amine, a tertiary amine, an aromatic amine, a cyclic amine or combinations thereof. The amine may contain one or more moieties such as methyl, ethyl, n-propyl, isopropyl, n-butyl, isobutyl, t-butyl, allyl, vinyl, cyclopentyl, cyclohexyl, phenyl, naphthyl, ethylene glycol, polyethylene glycol, and combinations thereof. Moieties attached to an amine nitrogen may contain one or more hydroxyl moieties attached to one or more moiety carbon atoms. In an embodiment, the amine comprises at least 90% of the liquid amine by mass. In a further embodiment, the amine comprises at least 99% of the liquid amine by mass.

In a particular embodiment, the clay-alkali-amine $CO_2$ sorbent is produced by generating a solid-solid heterogeneous mixture of the clay substrate and the basic alkali salt. In this particular embodiment, the clay substrate is supplied as a plurality of clay substrate granules, and the basic alkali salt is supplied as a plurality of basic alkali salt granules. Typically, a mean diameter of both the clay substrate granules and the basic alkali salt granules is less than about 500 micron, more typically less than about 100 micron. Additionally, the clay substrate particles may have a limited water content, for example less than about 15% by mass. In this embodiment, the clay substrate, basic alkali salt, and amine liquid are integrated by first mixing the clay substrate granules and the basic alkali salt granules to generate the solid-solid heterogeneous mixture, which is then combined with the amine liquid to produce the clay-alkali-amine $CO_2$ sorbent.

The clay substrate granules and the basic alkali salt granules may be mixed into the solid-solid heterogeneous mixture using any means known in the art. Various mixer types may be employed, for example those types typically referred to a static mixers, shaker-mixers, V-blenders, and others. Any means by which the basic alkali salt may be dispersed among the clay substrate particles is sufficient. Combination and mixing of the clay substrate granules and the basic alkali salt granules is typically conducted until the basic alkali salt particulates are substantially randomly dispersed within the clay substrate particles. Sufficient homogeneity of the solid-solid heterogeneous mixture can typically be gauged by those skilled in the art. In an embodiment, sufficient mixing was achieved using a 10 liter capacity EIRICH intensive mixer on low speed for about 15-20 minutes. In an additional embodiment, the solid-solid heterogeneous mixture has a Lacey mixing index greater than 0.5 based on the proportion of the basic alkali salt. See e.g., Tasirin et al., "Mixing Process of Binary Polymer Particles in Different Type of Mixers," Modern Applied Science 3(6)(2009) and incorporated references, among many others.

The solid-solid heterogeneous mixture is then combined with the amine liquid. In an embodiment, the solid-solid heterogeneous mixture is combined with the amine liquid in a mixer appropriate for solid-liquid mixing. In another embodiment, the solid-solid heterogeneous mixture takes the form of a plurality of porous clay-alkali pellets having a mean diameter less than about 30 mm, where a porous clay-alkali pellet contains physically interconnected pores which create conduits within the clay-alkali pellet, and which are in fluid communication with an atmosphere surrounding the clay-alkali pellet. In this embodiment, the solid-solid heterogeneous mixture is combined with the amine liquid by stirring and/or coating the plurality of porous clay-alkali pellets with the amine liquid and allowing at least some portion of the amine liquid to penetrate the interconnected pores of the porous clay-alkali pellets, thereby generating the clay-alkali-amine $CO_2$ sorbent. The resulting clay-alkali-amine $CO_2$ sorbent may additionally be subjected to a drying step conducted at a temperature of less than 120° C. for typically a period of at least 30 minutes.

Within this disclosure, the term "mean diameter" when referring to a plurality of granules or pellets means an equivalent spherical diameter such as a Sauter mean diameter determined by means known in the art such as sieving, microscopy, sedimentation, permeametry, laser diffraction, or other means, or as reported by a manufacturer. See e.g., Martin Rhodes, Introduction to Particle Technology (2nd ed. 2008).

In an additional embodiment, a liquid such as water may be added to the solid-solid heterogeneous mixture in order to assist in forming the plurality of porous clay-alkali pellets prior to combining the solid-solid heterogeneous mixture and the amine liquid. In another embodiment, the mass of the liquid added is less than 50% of the mass of the solid-solid heterogeneous mixture. The resulting porous clay-alkali pellets may additionally be subjected to a drying step, typically conducted at a temperature of at least 50° C. for a period of at least 30 minutes.

In a further embodiment, an alkaline solution is additionally added to the amine liquid, where the alkaline solution is comprised of a second basic alkali salt. The second basic alkali salt may have the same chemical composition as the initial basic alkali salt supplied, though this is not required. In this embodiment when the alkaline solution is utilized, the mass of the second basic alkali salt comprising the alkaline solution is less than about 30% of the mass of the amine comprising the amine liquid.

In a second particular embodiment, the basic alkali salt is supplied relative to the clay substrate in a weight ratio of from about 1 part to about 50 parts per 100 parts of the clay substrate and the amine liquid is supplied relative to a clay-alkali combination at from about 1 part to about 10 parts per 10 parts of the clay-alkali combination as before. In this particular embodiment, the clay substrate is a plurality of porous clay pellets, where a porous clay pellet contains physically interconnected pores which create conduits within the porous clay pellet, and where at least some portion of the interconnected pores are in fluid communication with an atmosphere surrounding the porous clay pellet. Further, in this particular embodiment, the basic alkali salt is in the form of an alkali solution comprised of the basic alkali salt, where the mass of the basic alkali salt comprising the alkali solution is less than about 30% of the mass of the amine comprising the amine liquid. Here, integrating the clay substrate, the basic alkali salt, and the amine liquid is comprised of initially generating an amine-alkali liquid by blending the liquid amine, the alkali solution, and a solvent, where the basic alkali salt is soluble in the solvent and where the solvent is soluble in the amine. The plurality of porous clay pellets is then contacted with the amine-alkali liquid by stirring and/or coating the plurality of porous clay pellets with the amine-alkali liquid and allowing at least some portion of the amine-alkali liquid to penetrate the interconnected pores of the porous clay pellets, thereby generating the clay-alkali-amine $CO_2$ sorbent. In this embodiment, the clay-alkali-amine $CO_2$ sorbent may be additionally subjected to a drying step conducted at a temperature of less than 120° C. for a period of at least 30 minutes.

Clay substrates, basic alkali salts, liquid amines, and alkaline solutions as described within the various embodiments herein are commercially available from manufacturers such as, for example, Sigma-Aldrich Co. LLC, St. Louis, Mo., among others.

The clay-alkali-amine $CO_2$ sorbent produced using the methods disclosed is particularly suitable for the absorption of $CO_2$ from a gas stream when the gas stream contains a low concentration of $CO_2$ and is additionally comprised of moisture and relatively high oxygen temperatures below around 80° C. In this environment, the clay-alkali-amine $CO_2$ sorbent exhibits stable reactivity and appears to greatly mitigate the impact of oxygen degradation of the encapsulated amine, as compared to other clay-amine sorbents prepared without the basic alkali salt as described.

Clay-Alkali-Amine $CO_2$ Sorbent Demonstration:

Embodiments of the clay-alkali-amine $CO_2$ sorbent prepared by the methods disclosed herein were tested against existing clay-amine sorbents, which are prepared by methods that lack incorporation of the basic alkali salt as described. In these embodiments, the clay substrate was bentonite, the basic alkali salt was NaOH, and the amine liquid was a DEA liquid comprised of about 99 wt. % diethanolamine (DEA).

A first clay-alkali-amine $CO_2$ sorbent (Clay-NaOH/DEA(1)) was prepared according to an embodiment of the disclosed method. The clay substrate was supplied as a plurality of bentonite granules and the basic alkali salt was supplied as a plurality of NaOH granules, where the mean diameter of both the bentonite and NaOH granules was less than about 100 micron. The NaOH granules were supplied relative to the bentonite granules in a weight ratio of about 1 part per 15 parts of the bentonite granules, and the DEA liquid was supplied relative to the bentonite-NaOH combination in a weight ratio of about 0.5 parts per 3 parts of the bentonite-NaOH combination.

The bentonite, NaOH, and DEA liquid were integrated by first mixing the bentonite and NaOH granules to generate a solid-solid heterogeneous mixture of bentonite/NaOH, adding a small amount of water to the bentonite/NaOH to form bentonite-NaOH pellets, drying the bentonite-NaOH pellets at a temperature greater than 100° C., then combining the bentonite-NaOH pellets and the DEA liquid by mixing and allowing the DEA liquid to impregnate the pores of the bentonite-NaOH pellets. The thus produced Clay-NaOH/DEA(1) sorbent was additionally subjected to a drying step at a temperature of less than 120° C.

A second clay-alkali-amine CO2 sorbent (Clay/DEA-NaOH(2)) was additionally prepared according to another embodiment of the disclosed method, where a clay substrate comprised of bentonite was supplied as a plurality of porous clay pellets. The basic alkali salt was supplied as a NaOH solution in DEA. The DEA-NaOH liquid was supplied within the 1-2 parts per 3 parts of the bentonite. Additionally, the mass of NaOH comprising the NaOH-DEA solution supplied was about 10% of the mass of the DEA comprising the DEA liquid. Initially the DEA liquid and NaOH, as described were blended to generate a DEA-NaOH liquid, and the plurality of porous clay pellets. The thus produced Clay/DEA-NaOH(2) sorbent was additionally subjected to a drying step at a temperature of less than 120° C.

Additionally, a clay-amine sorbent (Clay/DEA) lacking incorporation of the basic alkali salt was prepared according to the method disclosed in U.S. Pat. No. 6,908,497 to Siriwardane. The Clay/DEA sorbent was prepared with bentonite and DEA.

The Clay-NaOH/DEA(1), Clay/DEA-NaOH(2), and Clay/DEA sorbents prepared were tested to determine the impact of the basic alkali salt inclusion as described in the preparation methods disclosed. The respective sorbents were tested for $CO_2$ sorption in an atmospheric fixed bed flow reactor. A quantity of 0.5-1 g of sorbent was placed in the fixed bed flow reactor. The sorption of $CO_2$ was performed with 1050-2289 PPM C02, 21% $O_2$, Balance N2 at a flow rate of 50 cc/min. Regenerations were performed at 50° C. with air (without $CO_2$) or N2 at a flow rate of 70 cc/min. During the cyclic tests the $CO_2$ sorption time was limited to 60 minutes when 1050 ppm $CO_2$/air was used and the time was limited to 30 minutes when 2289 ppm $CO_2$/air was used. The breakthrough time used for $CO_2$ sorption calculations was 500 ppm of the $CO_2$ concentration did not reach the 500 ppm level during the specified absorption time, the $CO_2$ absorption capacity was calculated for the whole time period.

Figure 3:
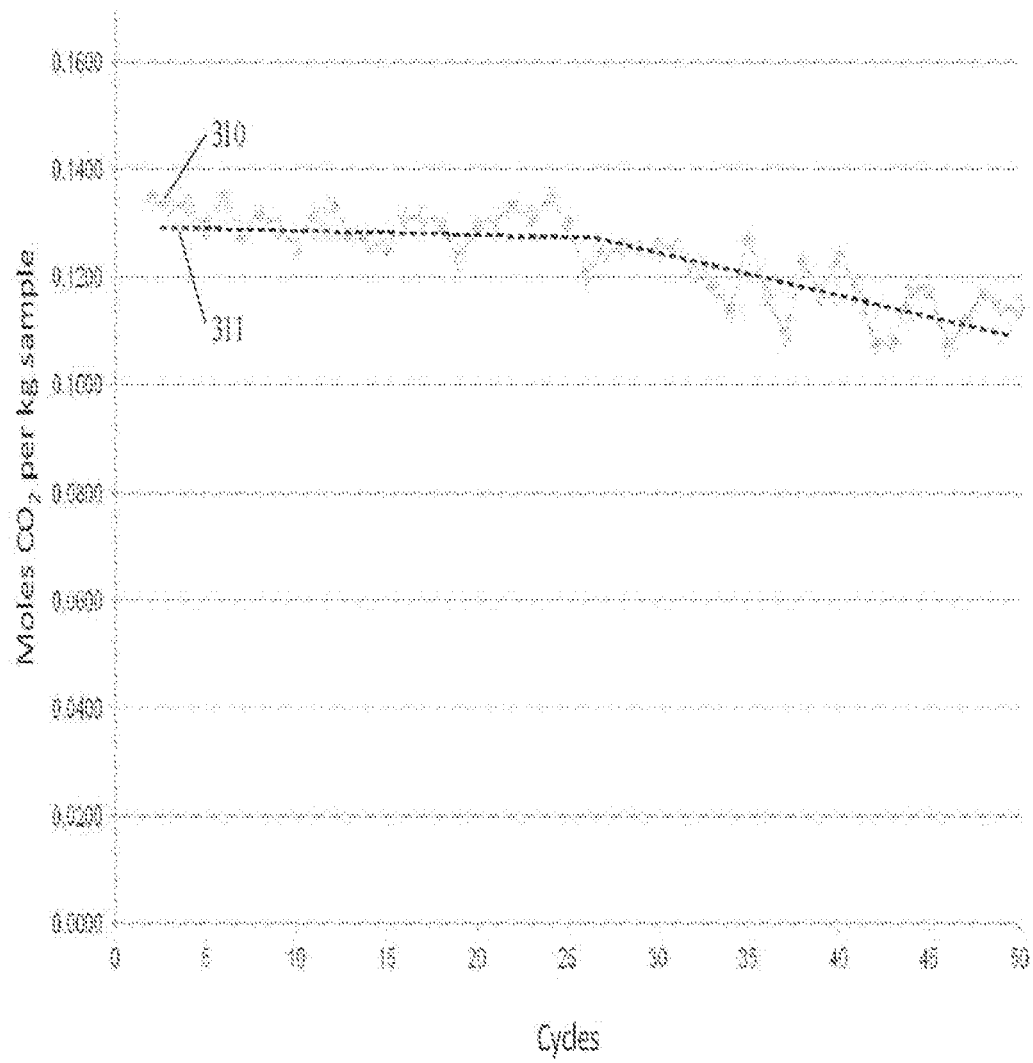
FIG. 3 illustrates the performance of a clay-amine lacking a basic alkali salt.

Initially the performance data ($CO_2$ capture capacity vs. time) of the Clay/DEA sorbent without alkali was evaluated as a baseline. The performance data (moles of $CO_2$ uptake by 1000 g of the solid sorbent at each cycle) during the 50 cycle test is illustrated at FIG. 3. The sorption was done at 40 C at about 0.23 vol % $CO_2$ in air with 3% moisture, and regeneration was done with N2 at 50° C. The clay-amine sorbent showed stable reactivity up to 25 cycles followed by a decrease in $CO_2$ capture capacity after that, as illustrated by test data line 310 and trend line 311. Since the regenerations were conducted at 50° C., the amine liquid loss from the sorbent was expected to be minimal. In order to determine whether there was a liquid amine loss during the 50 cycle test, nitrogen analysis of fresh Clay/DEA sorbent and the Clay/DEA sorbent after the 50-cycle test was conducted. The nitrogen content was very similar in both fresh and reacted materials which indicated no amine loss in the Clay/DEA sorbent after the cyclic test.

Figure 4:
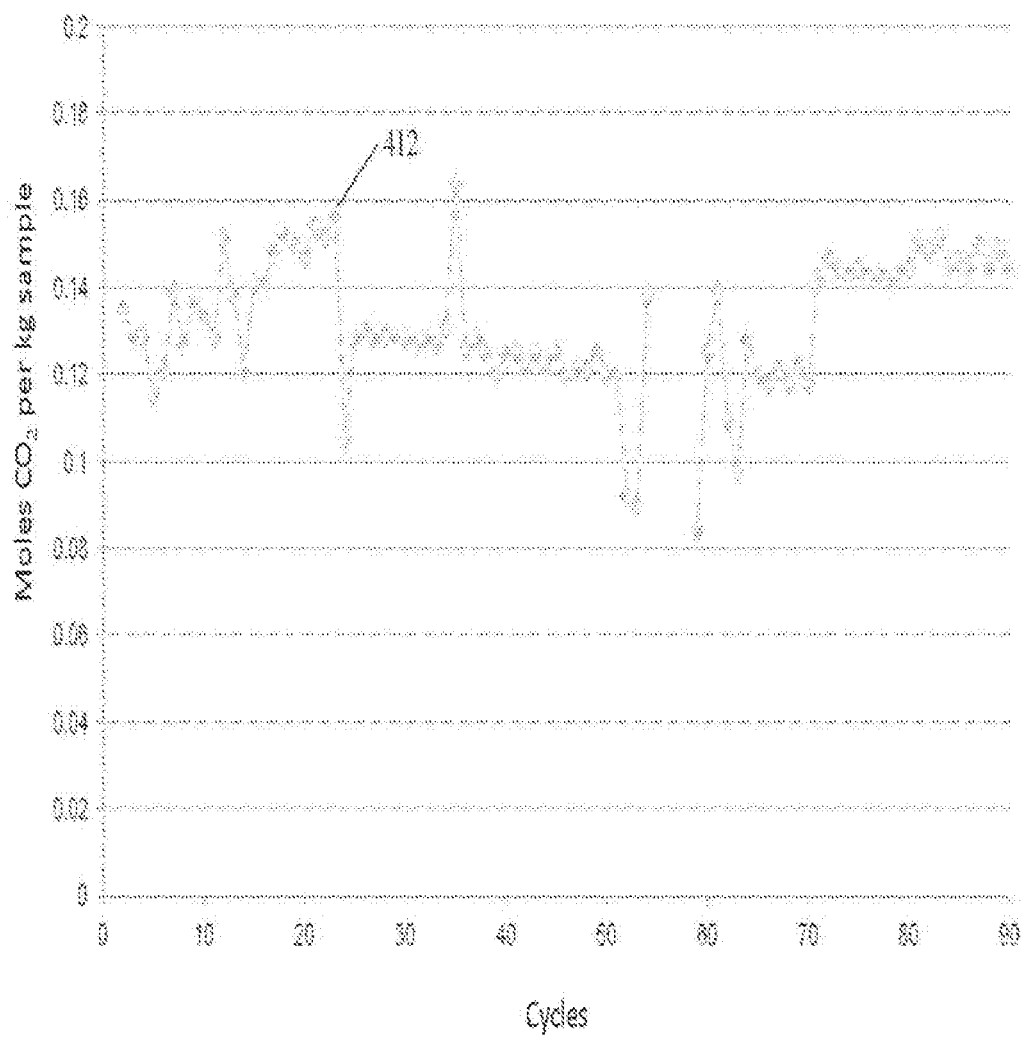
FIG. 4 illustrates the performance of an embodiment of the clay-alkali-amine $CO_2$ sorbent designated Clay-NaOH/DEA (1).
Figure 5:
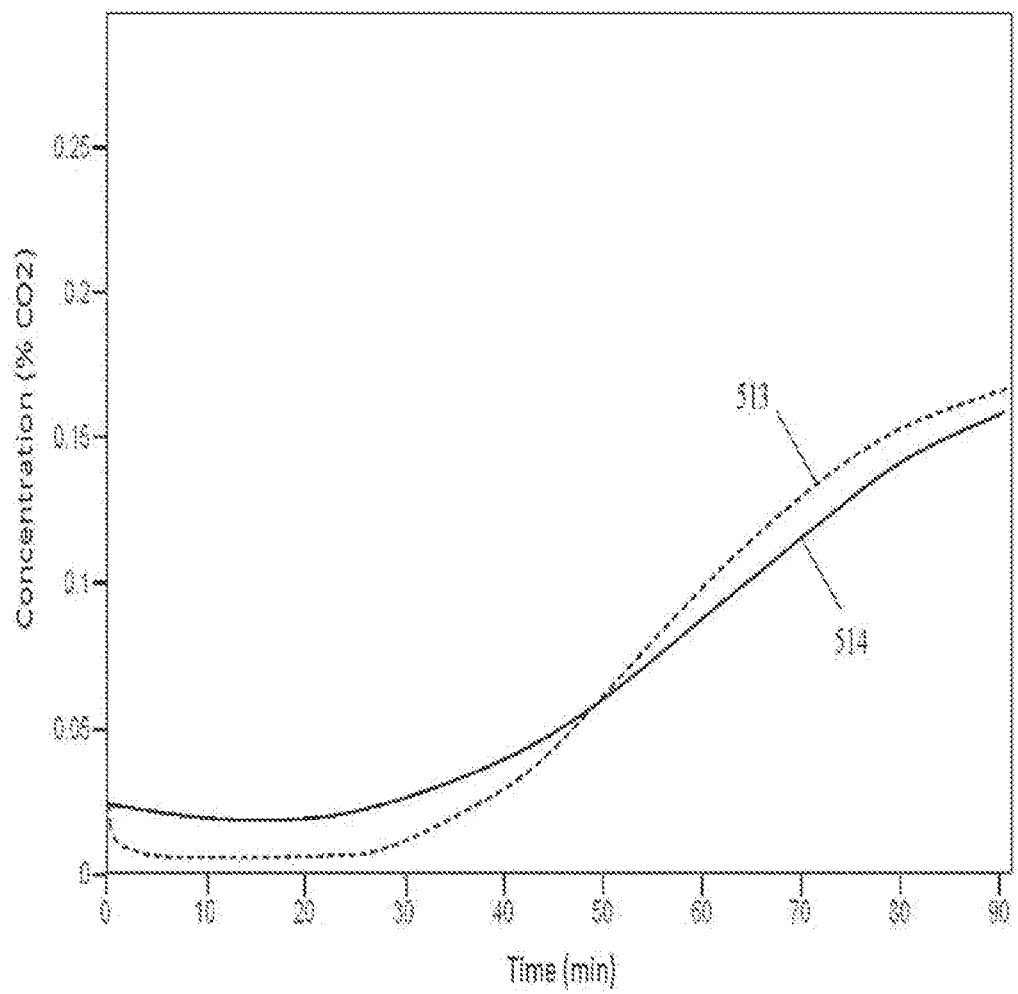
FIG. 5 illustrates comparison data of effluent $CO_2$ concentration profiles for reacted and the fresh samples of Clay-NaOH/DEA(1).

For comparison, the Clay-NaOH/DEA(1) sorbent was evaluated over a 90 cycle test. The sorption was done at 40° C. at about 0.23 vol % $CO_2$/air/3% moisture and regeneration was done with air at 50° C. The $CO_2$ capture data during the 90 cycle test is shown at FIG. 4, illustrating test data line 412. It is clear that the $CO_2$ capture performance was very stable during the 90 cycle test even after regenerating with air at 50 C. During the 90 cycle test the sorption time was limited to 30 minutes. Additionally, at the 91st cycle, the $CO_2$ sorption was also performed for 90 minutes, with the comparison data of the $CO_2$ concentration (measured at the outlet of the reactor) profiles of the reacted and the fresh sample shown in FIG. 5 as 513 and 514 respectively. It is clear that the $CO_2$ sorption profiles of the fresh and the reacted samples are very similar and the sorbent had minimal degradation during the 90 cycle test.

Figure 6:
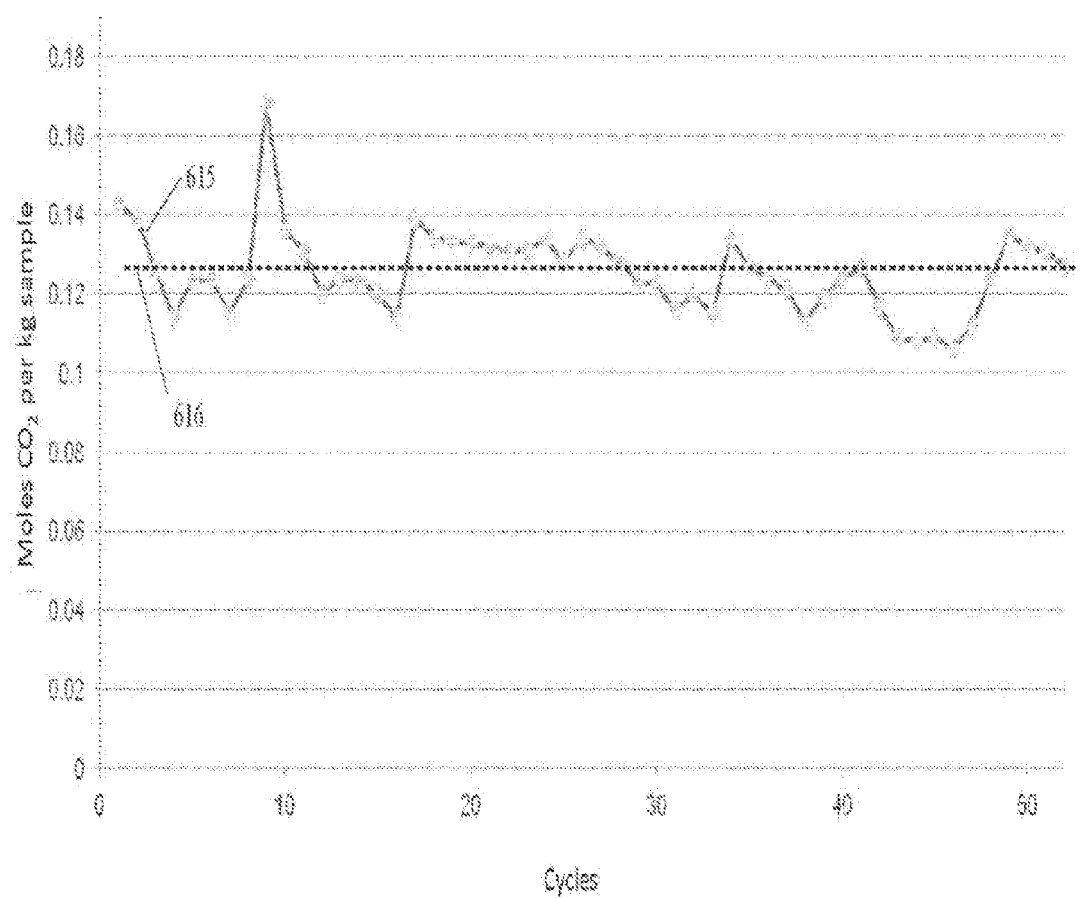
FIG. 6 illustrates the performance of an embodiment of the clay-alkali-amine $CO_2$ sorbent designated Clay/DEA-NaOH (2) using $N_2$ regeneration.
Figure 7:
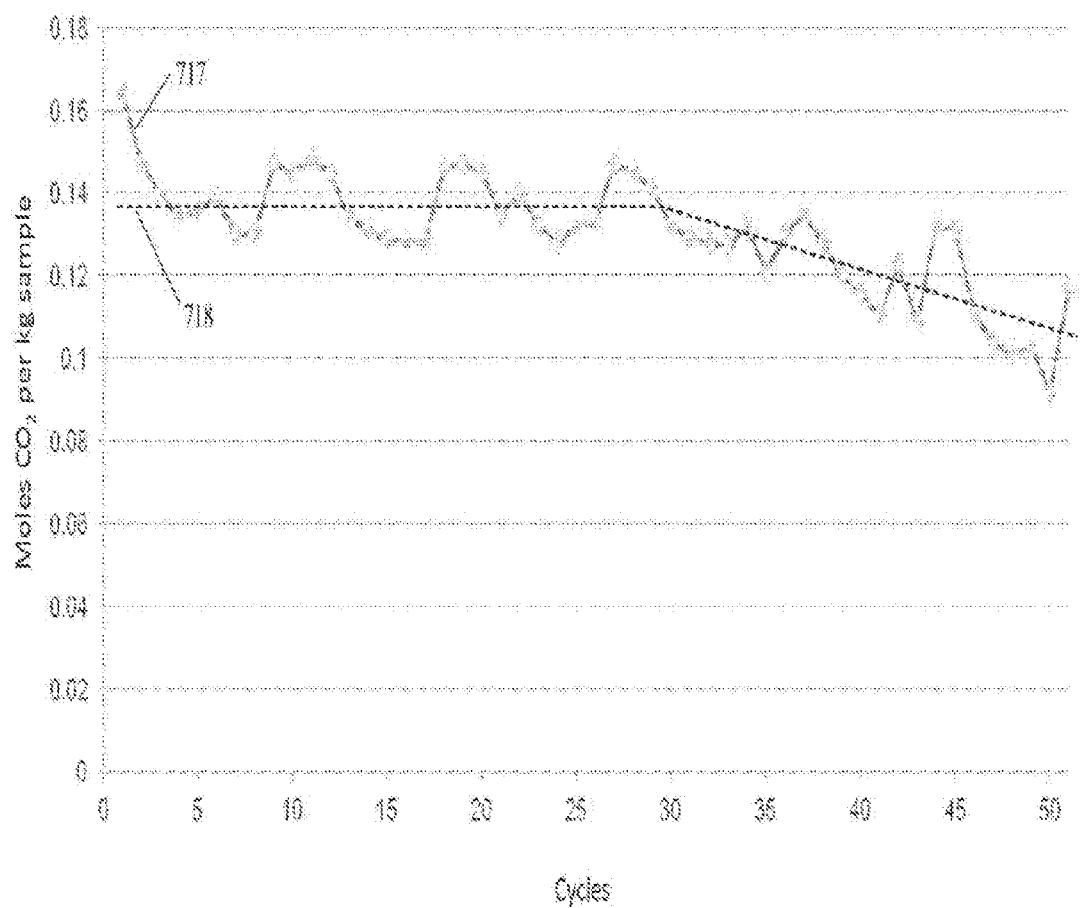
FIG. 7 illustrates the performance of an embodiment of the clay-alkali-amine $CO_2$ sorbent designated Clay/DEA-NaOH (2) using air regeneration.

Additionally, the Clay/DEA-NaOH(2) sorbent was evaluated over 50 cycle tests. The sorption was done at 40° C. at about 0.23 vol % $CO_2$/air/3% moisture, and regeneration was done with $N_2$ at 50° C. in a first test and air at 50° C. in a second test. Performance data for the first test ($N_2$ regeneration) is shown at FIG. 6, illustrated by test data line 615 and trend line 616. The results indicate that the $CO_2$ capture capacity is stable during the 50 cycle test conducted with $N_2$ regeneration. Performance data for the second test (air regeneration) is shown at FIG. 7, illustrated by test data line 717 and trend line 718. As indicated, under air regeneration, Clay/DEA-NaOH(2) sorbent showed stable reactivity up to about 25 cycles but exhibited a decrease in $CO_2$ capture capacity after about 25 cycles. The solubility of NaOH in DEA is relatively low, and the results of FIG. 7 compared to FIG. 5 indicate a likely advantage to incorporating the basic alkali salt through the solid-solid heterogeneous mixture disclosed. NaOH solutions with high concentrations are also known to have adverse effects on the clay structure.

A third clay-alkali-amine $CO_2$ sorbent (Clay-Na2CO3/DEA-NaOH) was additionally prepared according to another embodiment of the disclosed method. In this embodiment, the clay substrate was supplied as a plurality of bentonite granules and the basic alkali salt was supplied as a plurality of $Na_2CO_3$ granules, where the mean diameter of both the bentonite and $Na_2CO_3$ granules was less than about 100 micron, and the Na2CO3 granules were supplied in a weight ratio of about 1.4 parts per 15 parts of the bentonite granules (1:11). The bentonite and $Na_2CO_3$ granules were mixed to generate a solid-solid heterogeneous mixture of bentonite/$Na_2CO_3$ and a small amount of water was added to form bentonite-$Na_2CO_3$ pellets, followed by drying at a temperature greater than 100° C. Additionally, an alkaline solution comprised of NaOH was added to the DEA liquid, where the mass of the NaOH was about 3.5% of the DEA comprising the DEA liquid. The resulting DEA/NaOH liquid was supplied in a weight ratio of about 1.5 parts per 3 parts of the bentonite-$Na_2CO_3$ combination and combined with the bentonite-$Na_2CO_3$ pellets by mixing and allowing the DEA/NaOH liquid to impregnate the pores of the bentonite-$Na_2CO_3$ pellets. The thus produced Clay-$Na_2CO_3$DEA-NaOH sorbent was additionally subjected to a drying step at a temperature of less than 120° C.

Figure 8:
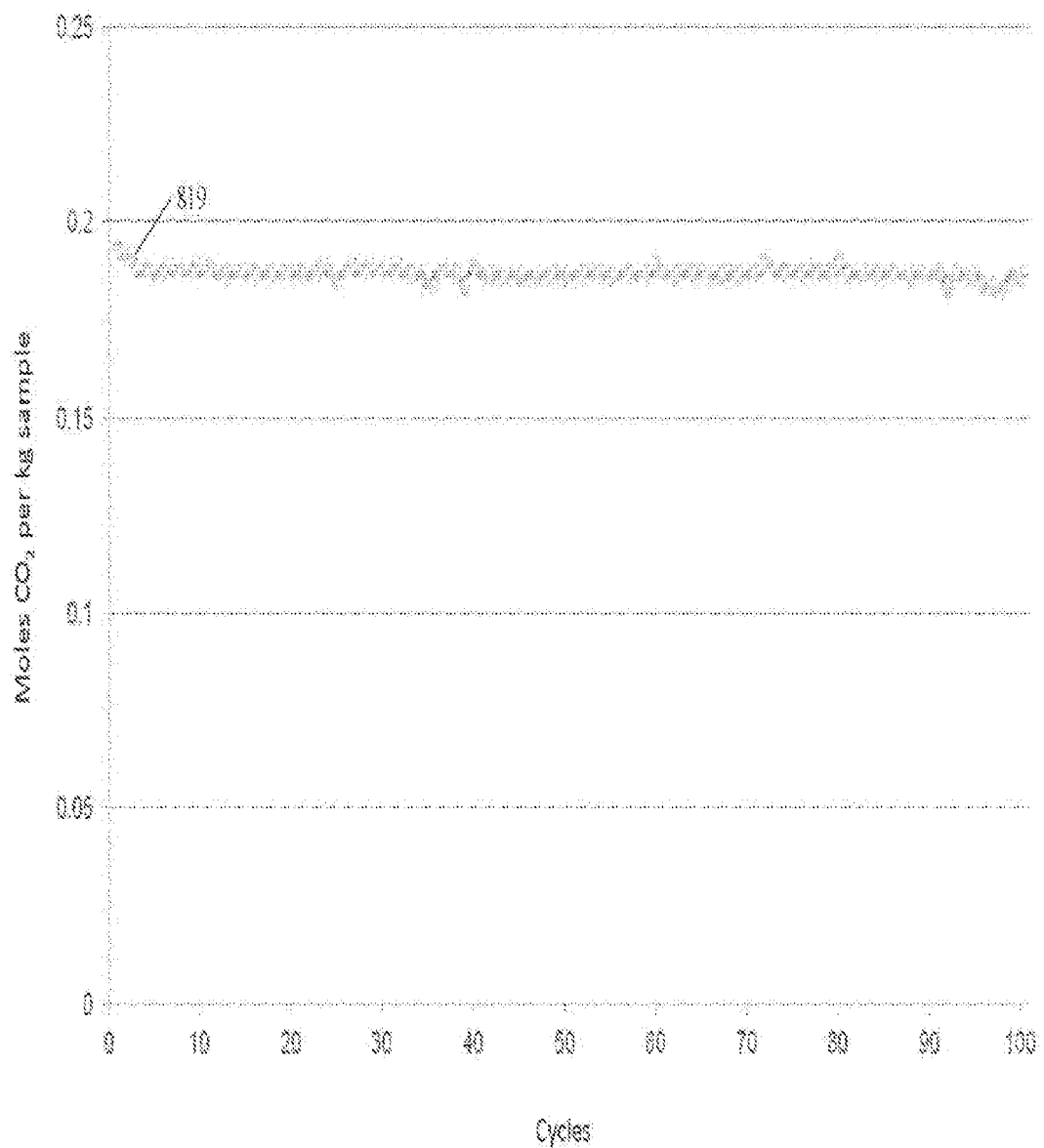
FIG. 8 illustrates the performance of an embodiment of the clay-alkali-amine $CO_2$ sorbent designated Clay-$Na_2CO_3$DEA-NaOH.
Figure 9:
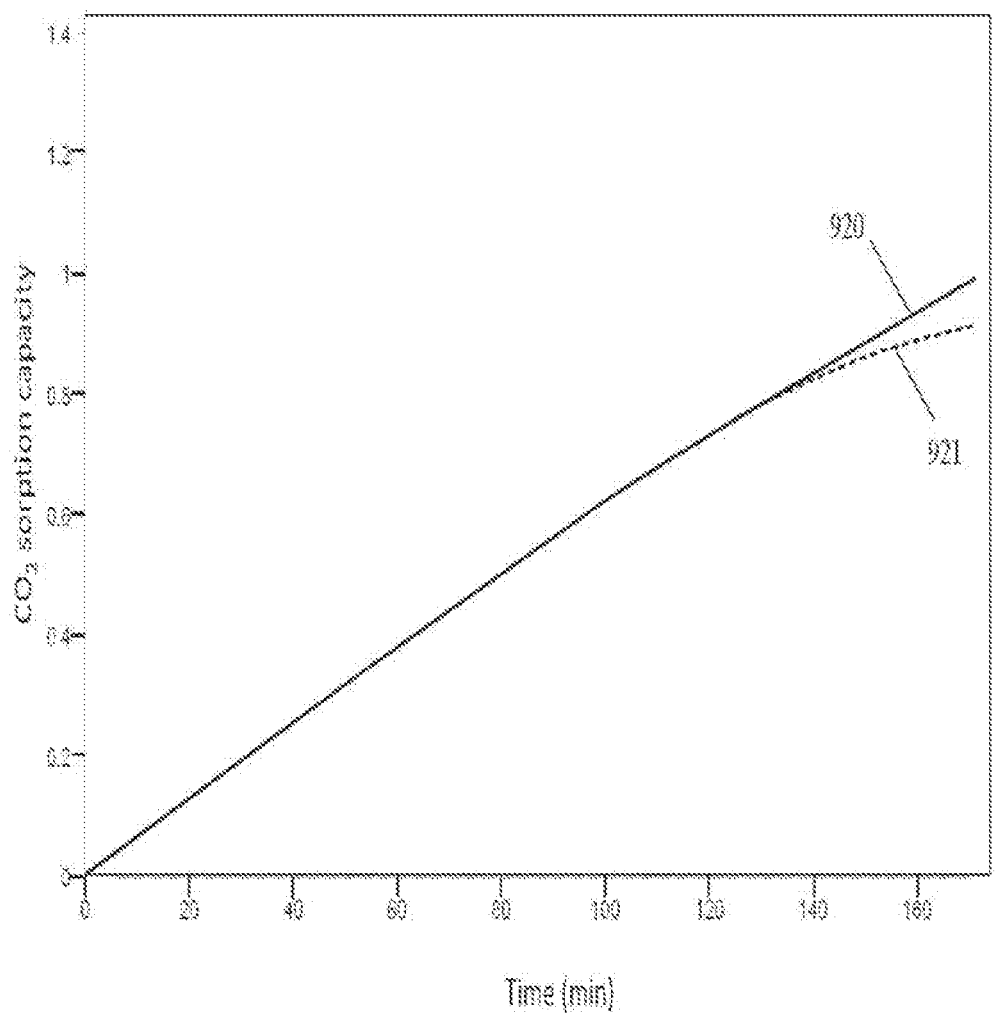
FIG. 9 illustrates comparison data of $CO_2$ sorption profiles for reacted and the fresh samples of Clay-$Na_2CO_3$/DEA-NaOH.

The Clay-$Na_2CO_3$DEA-NaOH sorbent was also evaluated over a 100 cycle test. The sorption was done at 40° C. at about 0.23 vol. % $CO_2$/air/3% moisture, and regeneration was done with air at 50° C. The $CO_2$ capture data during the 100 cycle test is shown at FIG. 8, illustrating test data line 819. The $CO_2$ capture performance was very stable during the 100 cycle test. Additionally, at the 101st cycle, the CO2 sorption was also performed for 160 minutes, with comparison data of the CO2 sorption profiles of the reacted and the fresh sample indicated at FIG. 9. The $CO_2$ concentration profiles at FIG. 9 are highly similar up to about 120 minutes and diverge slightly thereafter, with the fresh sample indicated at 920 and the reacted sample indicated at 921. It is clear that the $CO_2$ sorption profiles of the fresh and the reacted samples are very similar and the sorbent had minimal degradation during the 100 cycle test.

Thus disclosed here is a clay-alkali-amine $CO_2$ sorbent composition comprised of a clay substrate, a basic alkali salt, and an amine liquid for the capture of $CO_2$ from a gas stream. The clay substrate serves as a plurality of internally situated reaction sites facilitating reaction of the amines with $CO_2$, and the basic alkali salt acts as a strong base possibly absorbing $H_2O$ to generate a high pH environment. The basic alkali salt greatly mitigates oxygen degradation of the amine and significantly prolongs the useful life of the clay-alkali-amine $CO_2$ sorbent. The clay-alkali-amine $CO_2$ sorbent produced is particularly advantageous for low temperature $CO_2$ removal cycles where $CO_2$ is present at ppm levels and where oxygen concentrations are increased, such as low temperature $CO_2$ removal cycles from air having a $CO_2$ concentration less than around 2000 ppm and an oxygen concentration around 21%.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

We claim:

1. A clay-alkali-amine $CO_2$ sorbent composition comprising:
   a clay substrate;
   a first basic alkali salt; and
   an amine liquid;
   where the basic alkali salt is supplied at from about 1 part to about 50 parts per 100 parts of the clay substrate by weight, and
   where the amine liquid is supplied at from about 1 part to about 10 parts per 10 parts of a clay-alkali combination by weight; wherein said clay substrate, said first basic alkali salt and said amine liquid have been integrated to produce the clay-alkali-amine $CO_2$ sorbent.

2. The composition of claim 1 where the first basic alkali salt and the amine are encapsulated between interlayers of the clay substrate.

3. The composition of claim 1 where the clay substrate is a plurality of clay substrate granules and where the basic alkali salt is a plurality of basic alkali salt granules and the amine is a liquid.

4. The composition of claim 3 where the plurality of clay substrate granules and the plurality of clay substrate granules and plurality of basic alkali salt granules are a solid-solid heterogeneous mixture.

5. The composition of claim 3 where the plurality of clay substrate granules and the plurality of basic alkali salt granules has a mean diameter of less than 500 micron.

6. The composition of claim 1 where the clay substrate and the basic alkali salt comprise porous clay-alkali pellets.

7. The composition of claim 6 where the amine liquid penetrates some portion of the pores of the porous clay-alkali pellets.

8. The composition of claim 6 where the mean diameter of the porous clay-alkali pellets is less than 30 mm.

9. The composition of claim 1 further comprising a second basic alkali salt.

10. The composition of claim 9 where the first basic alkali salt, the second basic alkali salt, and the amine are encapsulated between interlayers of the clay substrate.

11. The composition of claim 3 where the basic alkali salt is comprised of a metallic cation and an anion, where the metallic cation is Na, K, Li, Rb, Cs, Ca, Ba, or Sr and where the anion is hydroxide ion, a carbonate ion, a acetate ion, a phosphate ion, or an oxide.

12. The composition of claim 11 where the metallic cation is Na and the anion is the carbonate ion, and further comprising a second basic alkali salt, where the second basic alkali salt is comprises of Na, and where a mass of the second basic alkali salt is less than about 30% of the mass of the amine comprising the amine liquid.

13. The composition of claim 6 where the basic alkali salt is comprised of a metallic cation and an anion, where the metallic cation is Na, K, Li, Rb, Cs, Ca, Ba, or Sr and where the anion is hydroxide ion, a carbonate ion, a acetate ion, a phosphate ion, or an oxide.

14. The composition of claim 13 where the metallic cation is Na and the anion is the carbonate ion.

15. A clay-alkali-amine $CO_2$ sorbent composition comprising:
  a clay substrate,
  a first basic alkali salt,
  where the basic alkali salt is comprised of a metallic cation and an anion where the metallic cation is Na, K, Li, Rb, Cs, Ca, Ba, or Sr and where the anion is hydroxide ion, a carbonate ion, an acetate ion, a phosphate ion, or an oxide ion, and
  where the basic alkali salt is supplied at from about 1 part to about 50 parts per 100 parts of the clay substrate by weight;
  where the clay substrate and the basic alkali salt comprise porous clay-alkali pellets; an amine liquid comprised of an amine,
  where the amine liquid is supplied at from about 1 part to about 10 parts per 10 parts of a clay-alkali combination by weight, and
  where the amine liquid to penetrates some portion of the pores of the porous clay-alkali pellets.

16. The composition of claim 15 where the first basic alkali salt and the amine are encapsulated between interlayers of the clay substrate.

17. The composition of claim 15 further comprising a second basic alkali salt, and where a mass of the second basic alkali salt is less than about 30% of the mass of the amine comprising the amine liquid.

18. The composition of claim 17 where the first basic alkali salt, the second basic alkali salt, and the amine are encapsulated between interlayers of the clay substrate.

19. The composition claim 17 where a mean diameter of the porous clay-alkali pellets is less than 30 mm.

* * * * *